United States Patent [19]

Henschel

[11] 4,064,082
[45] Dec. 20, 1977

[54] ASPHALTIC COMPOSITION AND ITS MANUFACTURE

[75] Inventor: Leonard Henschel, Princeton, N.J.

[73] Assignee: Mobil Oil Corporation, New York, N.Y.

[21] Appl. No.: 673,171

[22] Filed: Apr. 2, 1976

[51] Int. Cl.² ............................................. C08L 91/00
[52] U.S. Cl. ........................ 260/27 EV; 260/28.5 AS
[58] Field of Search .................. 260/28.5 AS, 27 EV

[56] References Cited
U.S. PATENT DOCUMENTS 3,442,841  5/1969  Adelman ...................... 260/28.5 AS
3,821,144  6/1974  Goyer et al. ................. 260/28.5 AS Primary Examiner—Melvyn I. Marquis
Attorney, Agent, or Firm—Charles A. Huggett; Hastings S. Trigg

[57] ABSTRACT

Asphaltic compositions are provided comprising a major proportion of road asphalt, and minor proportions of thermal asphalt, ethylene-vinyl acetate copolymer and terpenic resin. A method for manufacturing such compositions is described involving dissolution of ethylene-vinyl acetate copolymer and terpenic resin in thermal asphalt and addition of the resulting solution to road asphalt.

9 Claims, No Drawings

ASPHALTIC COMPOSITION AND ITS MANUFACTURE

BACKGROUND OF THE INVENTION

1. Field of the Invention

This invention relates to asphaltic compositions and their manufacture and more particularly to asphaltic compositions characterized by improved thermal stability and bright appearance.

2. Description of the Prior Art

It has heretofore been known to use asphalt binders for road building and various other industrial applications. Such products, however, have exhibited poor elasticity, thereby limiting their use in fields requiring supple and high mechanically resistant products. In order to increase the desired elasticity, it has been proposed to incorporate various additives in the asphaltic composition, such as copolymers of ethylene and vinyl acetate, as more particularly described in U.S. Pat. No. 3,442,841. While the addition of ethylenevinyl acetate copolymers imparted increased elasticity to the resulting asphaltic compositions, it also unfortunately provided products exhibiting poor cohesion (i.e. stress necessary for a given deformation) and weak adhesiveness.

To enhance the latter properties while retaining desired elasticity characteristics, it has been proposed to provide an asphaltic composition comprising a major amount of asphalt, a minor amount of a copolymer of ethylene and vinyl acetate and a minor amount of a synthetic terpenic resin. Such compositions, which are the subject matter of U.S. Pat. No. 3,821,144, while providing distinctly improved products, have been lacking in desired thermal stability and appearance, with a dull surface haze characterizing the asphaltic compositions so produced.

SUMMARY OF THE INVENTION

In accordance with the present invention, there are provided improved asphaltic compositions of high thermal stability and bright appearance, while retaining good elasticity, cohesion and adhesiveness properties, thereby rendering the resulting products useful in a variety of applications, particularly as coatings for metal-work and orthotropic surfaces.

The improved asphaltic compositions of the present invention comprise a major proportion of road asphalt, a minor proportion of thermal asphalt, a minor proportion of a copolymer of ethylene and vinyl acetate and a minor proportion of a terpenic resin. In a more specific embodiment, the asphaltic compositions described herein comprise, by weight, about 50 to about 90 percent road asphalt, from about 4 to about 20 percent thermal asphalt, from about 0.5 to about 40 percent of a copolymer of ethylene and vinyl acetate and from about 0.2 to about 30 percent of a terpenic resin.

Road asphalts utilized in the asphaltic compositions of this invention are characterized by a softening point (Ring and Ball) from about 40° to about 60° C. and an ASTM softening point-penetration index at 25° C. from about 40 to about 70. They have a viscosity within the aforenoted softening point range of between about 200 and about 1000 centistokes at 275° F. These asphalts are normally obtained as residuals of atmospheric and/or vacuum distillation of conventional crude petroleum stocks.

Thermal asphalts employed in the present asphaltic compositions are characterized by a softening point (Ring and Ball) from about 40° to about 80° C. and an ASTM softening pointpenetration index at 25° C. from about 0 to about 40. They are characterized by a rapid consistency change per degree of temperature and have a viscosity within the indicated softening point range of between about 50 and about 500 at 275° F. These asphalts are obtained by thermal cracking of synthetic tower bottoms from catalytic cracking units such as those employed in Thermafor Catalytic Cracking (TCC), Fluid Catalytic Cracking (FCC) or aromatic gas oils. It is contemplated that part or all of the thermal asphalt constituent may be replaced with coal tar pitch. Both are characterized by high temperature susceptibility, low viscosity at high temperature, becoming hard and brittle at low temperature and complete miscibility in each other. Atomic carbon/hydrogen ratios of thermal asphalt constituents are quite similar to the high values of coal tar pitch in reheological properties.

The copolymers of ethylene and vinyl acetate, which are employed in the asphaltic compositions of the present invention preferably comprise from about 10 to about 50 percent by weight, of units derived from the copolymerized vinyl acetate. Particular preference are accorded those copolymers of ethylene and vinyl acetate which have a melt index of from about 20 to about 50, determined in accordance with ASTM Method D 638.

The terpenic resins employed in the asphaltic compositions of the present invention are those derived from terpenic raw materials such as turpentine, pine oil and related materials. The principal constituent of turpentine is a terpene or pinene. The principal constituent of pine oil is a mixture of terpene alcohols (largely alpha terpineol) with small amounts of terpene hydrocarbons and ethers. The pine oil for such purpose is generally obtained by steamed distillation of pine wood. In addition to the recovery of pine oil and turpentine as employed in the above process, other terpene hydrocarbons such as limonene, dipentene, terpinene and terpinolene are also obtained as intermediate fractions. The methods generally employed for producing resinous materials from the aforementioned substances involve oxidation or polymerization. Evaporation of turpentine and pine oils in open vessels yields resinous materials as a result of oxidation and polymerization. The terpenic resins utilized herein may either be of natural or synthetic origin. A more complete description of such resins and particularly the latter can be found in "The Chemistry of Synthetic Resins" by Carleton Ellis, Vol. I, Rheinhold Publishing Corporation, New York, N.Y., 1935. Preferably, the terpenic resin employed in the present asphalt compositions has a softening point (Ring and Ball) from about 50° to about 200° C. Particular preference is accorded those terpenic resins having a softening point (Ring and Ball) from about 95° to about 105° C. and a specific gravity at 25° C. of about 0.9 to about 1.03. Other typical characterizing properties are an acid number of less than 10 and an iodine number of about 30.

The novel asphaltic compositions described hereinabove may be employed as such or in combination with various filler materials and inert aggregates, for imparting additionally desired properties to the composition. These fillers or aggregates, in combination with the aforementioned asphaltic compositions may typically comprise from about 85 to about 95 percent, by weight of the total asphaltic binder-aggregate mixture.

DESCRIPTION OF SPECIFIC EMBODIMENTS

In the addition of ethylene-vinyl acetate copolymer/terpene resin mixtures to road asphalt and to thermal asphalt, dramatic differences were observed in the appearance and nature of the resulting products. Thus, it was found that thermal asphalt was considerably more receptive to the addition of ethylene-vinyl acetate copolymer/terpene resin than conventional road asphalt. It was further observed that the ethylene-vinyl acetate copolymer/terpene resin mixture dissolved in thermal asphalt in less than half the time and at approximately 50° to 75° F. lower temperatures than conventional road asphalt. The products containing thermal asphalt were characterized by a high thermal stability and retained a bright appearance contrasted with the dull surface haze characterizing the ethylenevinyl acetate/terpene resin/road asphalt mixtures.

It was further found that the compositions of the present invention comprising a major proportion of road asphalt, a minor proportion of thermal asphalt, a minor proportion of a copolymer of ethylene and vinyl acetate and a minor proportion of a terpene resin could be readily and expeditiously made by initially dissolving the ethylene-vinyl acetate copolymer and terpene resin components in the thermal asphalt at a temperature within the approximate range of 275–300° F. and adding the resulting solution at a temperature not exceeding 300° F to the road asphalt. Such technique, in contrast to the manufacture of corresponding asphaltic compositions where the thermal asphalt component is absent, affords a compounding method in which rigid temperature precautions normally necessarily observed during manufacture and storage can be minimized. Thus, thermal asphalt having a low viscosity at high temperatures readily solubilize the copolymer and resin compnents at a temperature approximately 50–75° F. lower than the temperature required in the absence of thermal asphalt.

In preparing the concentrate of ethylene-vinyl acetate copolymer and terpene resin in thermal asphalt prior to the addition thereof to road asphalt, the ethylene-vinyl acetate copolymer and terpene resin may be initially mixed and such mixture dissolved in the thermal asphalt or alternatively the copolymer and resin may be dissolved individually in the thermal asphalt and the resulting mixture added to the road asphalt.

The following experimental data will serve to illustrate the properties and advantages of the compositions of this invention:

EXAMPLES 1–5

Asphalt ethylene-vinyl acetate copolymer/terpene resin compositions were formulated containing 20 weight percent of ethylene-vinyl acetate copolymer having a melt index of 43 and a vinyl acetate content of 33 percent, 5 weight percent of a synthetic polyterpene resin characterized by a softening point of 100±5° C., an ash of less than 0.1%, an acid number of less than 1, an iodine number of 30 and a specific gravity of 0.93, and various asphalts, as indicated hereinbelow.

These compositions were prepared by heating a 600 gram sample of the asphalt to 360° F. with continuous low speed stirring. Thirty grams of terpene resin were dissolved in the heated asphalt, after which 120 grams of the ethylene-vinyl acetate copolymer was added in increments until the mixture appeared homogeneous. Temperature was carefully controlled to a maximum of 370° F. so as to avoid breakdown of the polymer and stirring was conducted to provide effective dispersion with as little aeration as possible. After maintaining the mixture under such conditions for 2 hours, samples of the product were poured into shallow metal containers for inspection and testing.

Properties of the original asphalts employed and the compositions obtained after compounding with ethylene-vinyl acetate copolymer and terpene resin are shown in Table I below.

TABLE I

| Example Type | | 1 85/100 Pen(Road) | 2 60/70 Pen(Road) | 3 AC-20(Road) | 4 AC-10(Road) | 5 120 S.P.(Thermal) |
|---|---|---|---|---|---|---|
| Specific Grav. 77/77° F | | 1.003 | 1.003 | 1.033 | 0.9978 | 1.144 |
| Soft. Point (R&B), ° F | | 118 | 124 | 122 | 133 | 120 |
| Viscosity at | 210° F, SFS | 1680 | 2485 | 2212 | 915 | 296 |
| | 275° F, SFS | 192 | 240 | 249 | 115 | 27 |
| | 300° F, SFS | 106 | 134 | 138 | 64 | 15 |
| Penetration | 60/100/5 | 35 | 25 | 31 | 29 | 5 |
| | 77/100/5 | 91 | 64 | 82 | 74 | 33 |
| | 90/100/5 | 181 | 127 | 156 | 151 | 97 |
| PROPERTIES OF EVA/RESIN - ASPHALT COMPOSITIONS | | | | | | |
| Specific Grav. 77/77° F | | 0.9824 | 0.9827 | 1.014 | 0.9874 | 1.090 |
| Soft. Point (R&B), ° F | | 150 | 155 | 160 | 141 | 144 |
| Viscosity at | 275° F, SFS | 14144 | 13142 | 7184 | 5303 | 3365 |
| | 300° F, SFS | 5845 | 4750 | 3610 | 2027 | 1915 |
| | 350° F, SFS | 1816 | 1607 | 1300 | 1091 | 713 |
| Penetration | 60/100/5 | 41 | 31 | 34 | 36 | 9 |
| | 77/100/5 | 57 | 49 | 59 | 77 | 11 ½ |
| | 90/100/5 | 73 | 69 | 71 | 100 | 25 |

From the above results, it will be seen that the addition of ethylene-vinyl acetate copolymer/terpene resin increases the consistency of all of the asphalts as reflected in softening point, penetration and viscosity characteristics.

It was further observed that ethylene-vinyl acetate copolymer/terpene resin solubilized in the thermal asphalt in approximately half the time and at a temperature about 50° F. lower than in the road asphalts. It was also evident, upon inspection, that the finished thermal asphalt-containing mixtures had a bright, shiny appearance as compared with the dull surface haze found on the road asphalt-containing compositions.

EXAMPLES 6–10

Ethylene-vinyl acetate copolymer and terpene resin of the type described in the preceding examples were added in various proportions to road asphalt and to a road asphalt-thermal asphalt combination to provide the compositions shown in Table II below.

TABLE II

| Example | 6 | 7 | 8 | 9 | 10 |
|---|---|---|---|---|---|
| Composition (Wt. %) | Road Asphalt | 98.75 Road Asphalt<br>1.00 EVA Copolymer<br>0.25 Terpene Resin | 90.00 Road Asphalt<br>8.75 Thermal Asphalt<br>1.00 EVA Copolymer<br>0.25 Terpene Resin | 98.0 Road Asphalt<br>2.0 EVA Copolymer | 95.0 Road Asphalt<br>5.0 EVA Copolymer |
| Visc. 140° F, Poises | 1015 | 930 | 875 | 958 | 640 |
| 210° F, SFS/cs | 883/1842 | — | 1054/2199 | 1373/2866 | 2312/4804 |
| 275° F, SFS/cs | 106/228 | 133/280 | 131/275 | 162/341 | 318/668 |
| Penetration 77/100/5 | 75 | 85 | 92 | 98 | 135 |
| Softng.Pt. (R&B) ° F | 125 | 126 | 124 | 127 | 129 |
| Spec.Grav. 77/77 ° F | 1.000 | 0.9992 | 1.009 | 0.9986 | 0.9956 |
| Flash, COC, ° F | 615 | 615 | 590 | 600 | — |
| Ductility 77° F, cm. | 100+ | 100+ | 100+ | 100+ | 100+ |
| Thin Film Oven Tests Loss on Heating, % | .006 | .002 | .050 | .002 | .002 |
| Visc. 140° F, Poises | 3201 | 2836 | 2712 | 2901 | 1497 |
| Visc.Ratio 140° F | 3.19 | 3.05 | 3.10 | 3.03 | 2.34 |
| Ductility 60° F, cm. | 9 | 16 | 18 | 58 | 62 |
| 77° F, cm. | 78 | 100+ | 100+ | 100+ | 100+ |
| Appearance After TFO Test at 325° F | Satisfactory | Slight Haze | Satisfactory | Slight Separation | Heavy Separation |

It will be seen from the above results that the addition of the ethylene-vinyl acetate copolymer/terpene resin served to increase the consistency of the asphalt product as reflected in softening point and high temperature viscosity characteristics. It is further evident from Thin Film Over Testing (ASTM D1754) of the compositions for 5 hours at 325° F. that the presence of thermal asphalt dramatically improved the heat stability of the resulting product as contrasted those compositions in which thermal asphalt was absent.

In Example 8 where thermal asphalt was employed in minor proportion, the ethylene-vinyl acetate copolymer and terpene resin were initially dissolved in the thermal asphalt and the resulting solution was then added to the road asphalt. The finished composition so obtained had a homogeneous bright appearance compared with the dull surface haze common to conventional EVA - road asphalt mixtures.

The novels asphaltic compositions of this invention are useful in waterproofing and particularly applicable for use as coatings for orthotropic surfaces, e.g. as metallic bridge-paving materials where orthotropic plate superstructures are employed. These plates, longitudinally supported by a series of stiffeners separated from one another by specific distances, are referred to as orthotropic when their mechanical properties are not similar in two perpendicular directions. The pavement of these metallic bridges is subjected to stresses caused by vehicular traffic. These include vertical compressive stresses as well as horizontal stresses due to the strain applied by the weight of motor vehicles. The compositions described herein employed either individually or as binders for aggregate materials possess outstanding properties with respect to cohesiveness, elasticity, thermal stability and appearance and thus provide excellent bridge-paving materials, as well as being useful in other applications where the aforementioned properties are desired.

I claim:

1. An asphaltic composition comprising a major proportion of road asphalt, a minor proportion of thermal asphalt, a minor proportion of a copolymer of ethylene and vinyl acetate and a minor proportion of a terpenic resin.

2. The composition of claim 1 wherein the components are combined in the following approximately proportions by weight:

| | | | |
|---|---|---|---|
| Road Asphalt | 50 | to | 90 |
| Thermal Asphalt | 4 | to | 20 |
| Copolymer of Ethylene and Vinyl Acetate | 0.5 | to | 40 |
| Terpenic Resin | 0.2 | to | 30 |

3. The composition of claim 1 wherein said thermal asphalt is characterized by a softening point (Ring and Ball) from about 40° to about 80° C., an ASTM softening point-penetration index at 25° C. from about 0 to about 40 and a viscosity between about 50 and about 500 centistokes at 275° F.

4. The composition of claim 1 wherein said road asphalt is characterized by a softening point (Ring and Ball) from about 40° to about 60° C., an ASTM softening point-penetration index at 25° C. from about 40 to about 70 and a viscosity between about 200 and about 1000 centistokes at 275° F.

5. The composition of claim 1 wherein said terpenic resin has a softening point (Ring and Ball) from about 50° C. to about 200° C.

6. The composition of claim 1 wherein the copolymer of ethylene and vinyl acetate comprises from about 10 to about 50 percent, by weight, of units derived from the copolymerized vinyl acetate.

7. The composition of claim 1 wherein said copolymer of ethylene and vinyl acetate has a melt index from about 20 to about 50.

8. A method for manufacturing an asphaltic composition comprising the steps of dissolving ethylene-vinyl acetate copolymer and terpenic resin in thermal asphalt and adding the resulting solution to road asphalt.

9. The method of claim 8 wherein the combining proportions of the components are such as to produce a product having the following weight percentage composition:

| | | | |
|---|---|---|---|
| Road Asphalt | 50 | to | 90 |
| Thermal Asphalt | 4 | to | 20 |
| Copolymer of Ethylene and Vinyl Acetate | 0.5 | to | 40 |
| Terpenic Resin | 0.2 | to | 30 |

* * * * *